(12) United States Patent
Morozumi et al.

(10) Patent No.: US 7,972,690 B2
(45) Date of Patent: *Jul. 5, 2011

(54) DECORATIVE SHEET, FORMED PRODUCT AND TRANSPORTATION APPARATUS

(75) Inventors: Naohiro Morozumi, Shizuoka (JP); Yasuo Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1041 days.

This patent is subject to a terminal disclaimer.

(21) Appl. No.: 11/749,953

(22) Filed: May 17, 2007

(65) Prior Publication Data

US 2007/0269642 A1 Nov. 22, 2007

(30) Foreign Application Priority Data

May 18, 2006 (JP) ................................. 2006-139584

(51) Int. Cl.
*B32B 5/66* (2006.01)
(52) U.S. Cl. ..... 428/323; 428/324; 428/328; 428/542.2; 428/195.1
(58) Field of Classification Search .................. 428/323, 428/324, 328, 542.2, 195.1, 402
See application file for complete search history.

(56) References Cited

U.S. PATENT DOCUMENTS

| | | | | |
|---|---|---|---|---|
| 7,371,453 B2 * | 5/2008 | Suzuki et al. | ............... | 428/195.1 |
| 7,659,007 B2 * | 2/2010 | Suzuki et al. | ............... | 428/542.2 |
| 7,678,469 B2 * | 3/2010 | Morozumi et al. | ........ | 428/542.2 |
| 2005/0112330 A1 | 5/2005 | Suzuki et al. | | |

FOREIGN PATENT DOCUMENTS

| | | |
|---|---|---|
| EP | 0 949 120 A1 | 10/1999 |
| EP | 1547764 A1 * | 11/2004 |
| EP | 1 547 764 A1 | 6/2005 |
| JP | 2002-275405 A | 9/2002 |
| JP | 2003-025793 A | 1/2003 |
| JP | 2005-153351 A | 6/2005 |

OTHER PUBLICATIONS

Suzuki et al.: "Decorative Sheet, Decorated Formed Product, Method of Making the Decorative Sheet and Method of Making the Decorated Formed Product," U.S. Appl. No. 12/336,639, filed on Dec. 17, 2008.
Official communication issued in counterpart European Application No. 07009854.6, mailed on Mar. 2, 2009.
Yasuo Suzuki et al.; "Decorative Sheet, Decorated Molded Article, and Motor Vehicle"; U.S. Appl. No. 11/718,646, filed May 4, 2007.
Yasuo Suzuki et al.; "Decorative Sheet, Molded Article, Motor Vehicle, and Production Method of Molded Article"; U.S. Appl. No. 10/972,168, filed Oct. 22, 2004.
Yasuo Suzuki et al.; "Process for Production of Moldings and Motor Vehicles"; U.S. Appl. No. 11/718,651, filed May 4, 2007.
Yasuo Suzuki et al.; "Decorative Sheet, Molded Article, and Motor Vehicle Provided With the Same"; U.S. Appl. No. 10/509,369, filed Sep. 28, 2004.
Naohiro Morozumi et al.; "Decorative Sheet, Formed Product and Transportation Apparatus"; U.S. Appl. No. 11/749,958, filed May 17, 2007.

* cited by examiner

*Primary Examiner* — Leszek Kiliman
(74) *Attorney, Agent, or Firm* — Keating & Bennett, LLP

(57) ABSTRACT

A decorative sheet includes a base member made of a resin material; a decoration layer, which is supported by the base member and which includes a pigment; and two resin layers, which are arranged so as to sandwich the decoration layer between them. The two resin layers are made of a resin material that has a lower load deflection temperature than the resin material of the base member.

23 Claims, 9 Drawing Sheets

DECORATIVE SHEET, FORMED PRODUCT AND TRANSPORTATION APPARATUS

BACKGROUND OF THE INVENTION

1. Field of the Invention

The present invention relates to a decorative sheet for use to decorate a formed product and also relates to a formed product decorated with such a decorative sheet and to a transportation apparatus including such a formed product.

2. Description of the Related Art

Various formed products are used as interior and exterior members for a transportation apparatus such as a car. Recently, it was proposed that a decorative sheet such as that disclosed in Japanese Laid-Open Patent Publication No. 2005-153351 be attached to the surface of a formed product as a technique of decorating various types of formed products.

FIG. 11 shows an example of the decorative sheet. The decorative sheet 110 shown in FIG. 11 includes a base member 1 of a resin material and a decoration layer 3 formed on the principal surface 1a of the base member 1 by printing a pattern on that surface 1a with ink, for example. The ink includes a resin material and a pigment that is dispersed in the resin material. By attaching this decorative sheet 110 to the surface of the body 121 of a formed product in the order shown in FIGS. 12A, 12B and 12C with an adhesive 8 applied on the decoration layer 3, a formed product 120 with a decorated surface can be obtained.

The formed product 121 shown in FIG. 12A includes a hemispherical (cuplike) raised portion 121a and therefore has a rugged surface. For that reason, the decorative sheet 110 being attached is stretched so as to follow such ruggedness perfectly. To stretch the decorative sheet 110 just as intended, the decorative sheet 110 is typically heated and softened before being attached. Japanese Laid-Open Patent Publication No. 2005-153351, also discloses a vacuum forming system for decorating a formed product with the decorative sheet 110.

A formed product with a decorative sheet can be recycled more easily than a formed product with a painted surface. In addition, a decorated product can have a different type of fine appearance from that of a painted product. That is why a decorative sheet contributes to improving the appearance of formed products noticeably. For these reasons, a method using a decorative sheet is very useful.

Meanwhile, a decoration technique using a luminous pigment has attracted a lot of attention recently. The luminous pigment has a property of absorbing and storing sunlight, light radiated from a fluorescent lamp, or any other type of energy and gradually releasing the energy and producing luminescence either at night or in the dark. By utilizing this property of the luminous pigment, the product can be decorated uniquely so as to give the user quite a different impression than simple painting.

Japanese Laid-Open Patent Publication No. 2003-25793 discloses a transfer film for decorating a wall, a piece of furniture, a consumer electronic product, or any other object with a luminous pigment. FIG. 13 illustrates a transfer film 210 as disclosed in Japanese Laid-Open Patent Publication No. 2003-25793, supra.

As shown in FIG. 13, the transfer film 210 includes, on a base member film 211 of polyester, a peel processing layer 212 that provides a release property to the base member film 211, a protective layer 213 made of a UV curable resin, and a luminescent coating layer 214 formed by dispersing a luminous pigment in a thermosetting epoxy resin. These layers 212, 213 and 214 are stacked in this order on the base member film 211. An aluminum evaporated layer 215 and an adhesive layer 216 are further deposited on the luminescent coating layer 214.

As shown in FIG. 14, by peeling the base member film 211 and the peel processing layer 212 after this transfer film 210 has been bonded to an object 221, the stack of the adhesive layer 216, the aluminum evaporated layer 215, the luminescent coating layer 214 and the protective layer 213 is transferred onto the object 221. As can be seen from the arrangement of the respective layers shown in FIG. 14, the protective layer 213 is arranged so as to protect the luminescent coating layer 214 after the film 210 has been transferred.

The transfer film disclosed in Japanese Laid-Open Patent Publication No. 2003-25793 is designed just for the purpose of transferring the luminescent coating layer. That is to say, the transfer film cannot be stretched while being attached as disclosed in Japanese Laid-Open Patent Publication No. 2005-153351. In other words, the transfer film cannot be attached so as to fit the surface shape of the formed product perfectly.

Also, if the luminous pigment were simply added to the decoration layer of the decorative sheet disclosed in Japanese Laid-Open Patent Publication No. 2005-153351, then the decoration layer could crack while the decorative sheet is being attached and might ruin the fine appearance of the sheet. This is because if the luminous pigment were added to the decoration layer, the decoration layer could not be stretched so easily as to keep up the stretch of the decorative sheet being attached or the shrinkage of the decorative sheet that has cooled down after that. Such cracking can be reduced to a certain degree by reducing the thickness of the decoration layer. If the decoration layer were thinned, however, the amount of the luminous pigment included in the decoration layer would decrease too much to make the decoration layer produce luminescence with a sufficiently high intensity for a long time.

Such a problem would arise not just when the luminous pigment is added to the decoration layer but also when the decoration layer may include a certain amount of pigment (e.g., when either a metallic pigment or a glass pigment is added to the decoration layer). If a decoration layer is formed using ink in which a metallic pigment is dispersed in a resin material, then the resultant decorative sheet can have a metallic color, which gives the product a great-looking metallic appearance, due to the metallic gloss of the metallic pigment. Also, if a decoration layer is formed using a glass pigment (i.e., a ceramic pigment), then the resultant decorative sheet can have a lame-like glittering appearance.

Nevertheless, if such a metallic pigment or glass pigment is added to the decoration layer, the decoration layer could also lose its stretchability so much so that it may crack from time to time while the decorative sheet is being attached. Such cracking can be reduced to a certain degree by reducing the thickness of the decoration layer. If the decoration layer were thinned, however, the amount of the metallic or glass pigment included in the decoration layer would decrease too much to achieve the expected decoration effect. Furthermore, even if the decoration layer includes only a normal coloring pigment, the decoration layer may also lose its stretchability so as to crack in some cases.

SUMMARY OF THE INVENTION

In order to overcome the problems described above, the present invention provides a decorative sheet that can make its decoration layer, including a pigment such as a luminous pigment, a metallic pigment or a glass pigment, achieve a sufficient decoration effect and that can minimize cracking of its decoration layer.

A decorative sheet according to a preferred embodiment of the present invention includes a base member made of a resin material; a decoration layer, which is supported by the base member and which includes a pigment; and two resin layers, which are arranged so as to sandwich the decoration layer between them. The two resin layers are preferably made of a resin material that has a lower load deflection temperature than the resin material of the base member.

In one preferred embodiment of the present invention, the load deflection temperature of the resin material of the two resin layers is lower by at least about 10° C. than that of the resin material of the base member.

In another preferred embodiment, the two resin layers are made of a resin material, of which the load deflection temperature is about 30° C. to about 85° C. when measured at a load of approximately 0.45 MPa compliant with the ASTM D648 standard.

In still another preferred embodiment, the tensile strength of the base member is greater than that of the decoration layer.

In yet another preferred embodiment, each resin layer has a thickness of about 3 μm to about 10 μm.

In yet another preferred embodiment, the two resin layers are a first resin layer, which is located between the decoration layer and the base member, and a second resin layer, which is located on an opposite side of the decoration layer from the first resin layer, and the first resin layer is thinner than the second resin layer.

In yet another preferred embodiment, the pigment has a mean particle size of about 5 μm to about 40 μm.

In yet another preferred embodiment, the pigment is a luminous pigment.

In this particular preferred embodiment, the decoration layer has a thickness of about 40 μm to about 80 μm.

In a specific preferred embodiment, the decoration layer includes about 75 wt % to about 80 wt % of the luminous pigment.

In yet another preferred embodiment, the decorative sheet further includes a light reflective layer, which is arranged on an opposite side of the decoration layer from the base member.

In this particular preferred embodiment, the light reflective layer includes a white pigment.

In a specific preferred embodiment, one of the two resin layers that is located on an opposite side of the decoration layer from the base member also functions as the light reflective layer.

In yet another preferred embodiment, the light reflective layer has a thickness of about 5 μm to about 20 μm.

In an alternative preferred embodiment, the pigment is a metallic pigment.

In this particular preferred embodiment, the decoration layer has a thickness of about 7 μm to about 60 μm.

In a specific preferred embodiment, the decoration layer includes about 5 wt % to about 80 wt % of the metallic pigment.

In another alternative preferred embodiment, the pigment is a glass pigment.

In that case, the decoration layer has a thickness of about 7 μm to about 60 μm.

In a specific preferred embodiment, the decoration layer includes about 5 wt % to about 35 wt % of the glass pigment.

A formed product according to a preferred embodiment of the present invention includes a formed product body and a decorative sheet according to any of the preferred embodiments of the present invention described above that has been bonded to a surface of the formed product body.

In one preferred embodiment of the present invention, a portion of the decorative sheet that has been bonded to the surface of the formed product body is about 30% to about 40% as thick as the thickest portion thereof.

A transportation apparatus according to a preferred embodiment of the present invention includes a formed product according to any of the preferred embodiments of the present invention described above.

A decorative sheet according to a preferred embodiment of the present invention includes a decoration layer with a pigment and two resin layers that are arranged so as to sandwich the decoration layer between them. The resin layers that sandwich the decoration layer are made of a resin material that has a lower load deflection temperature than the resin material of the base member. That is why when stress is applied to the resin layers during a forming or bonding process, the resin layers are deformed and stretched more easily than the base member. Consequently, while the decorative sheet is being stretched or is shrinking, these resin layers are deformed and stretched so as to reduce the stress applied to the decoration layer and function as a sort of cushions so to speak. And since two resin layers performing such a function are arranged over and under the decoration layer so as to sandwich the decoration layer between them, the interfacial stress that would cause cracking is reduced on both sides of the decoration layer. As a result, cracks in the decoration layer can be minimized. In addition, since there is no need to reduce the thickness of the decoration layer, a good amount of pigment can be included in the decoration layer. For that reason, the decoration layer achieves a sufficient decoration effect. For example, a decoration layer with a luminous pigment can produce luminescence at a sufficiently high intensity for a long time.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings. It should be noted, however, that the present invention is in no way limited to the following specific preferred embodiments.

Figure 1:
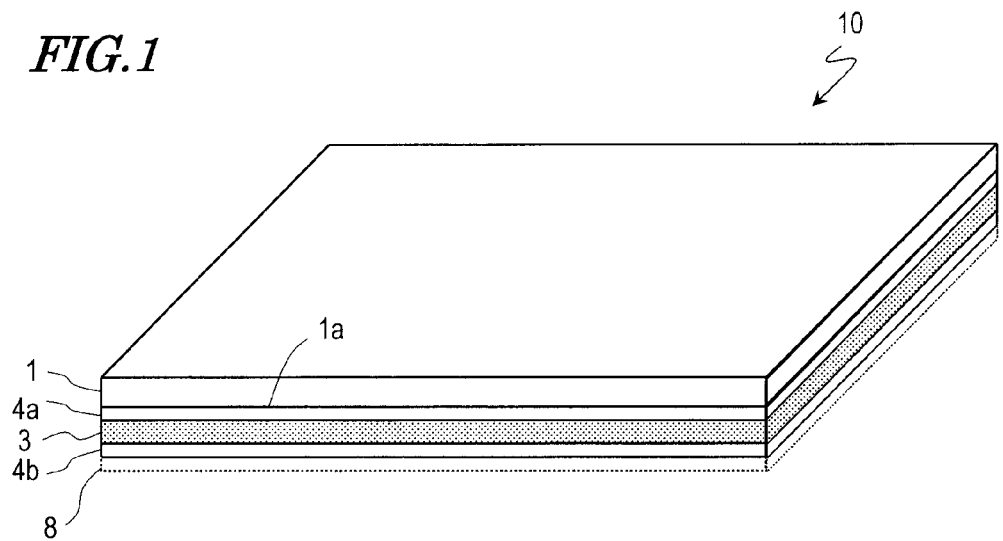
FIG. 1 is a perspective view schematically illustrating a decorative sheet 10 according to a preferred embodiment of the present invention.

FIG. 1 schematically illustrates a decorative sheet 10 according to a preferred embodiment of the present invention. As shown in FIG. 1, the decorative sheet 10 includes a base member 1 and a decoration layer 3 supported by the base member 1.

The base member 1 is preferably made of a resin material and is typically made of a thermoplastic resin such as polycarbonate or acrylic resin, for example. The base member 1 should have some degree of rigidity that is high enough to serve as a sheet base member. That is why the material is preferably selected in view of this respect. Also, since the base member 1 will be located on the uppermost surface of the formed product after the decorative sheet 10 is attached to the formed product, the base member 1 preferably has good weather resistance and good damage resistance. For that reason, a protective layer with good weather resistance and good damage resistance may be provided on the other side of the base member 1, i.e., opposite to the decoration layer 3.

The base member 1 preferably has a thickness of about 50 μm to about 1,000 μm. This is because if the base member 1 had a thickness of less than about 50 μm, the sheet would be difficult to handle or its mechanical strength could be too low to avoid tears when the sheet is being attached. On the other hand, if the thickness of the base member 1 exceeded about 1,000 μm, then the sheet could not fit closely the surface of the formed product.

The decoration layer 3 is arranged on one 1a of the two principal surfaces of the base member 1. In this preferred embodiment, the decoration layer 3 includes a pigment. The decorative sheet 10 of this preferred embodiment further includes two resin layers 4a and 4b, which are arranged so as to sandwich the decoration layer 3 between them as shown in FIG. 1.

The decoration layer 3 is preferably formed by dispersing a luminous pigment, a metallic pigment, a glass (ceramic) pigment or any other pigment in a resin material such as an acrylic resin, a urethane resin or an acrylic-urethane resin.

As the luminous pigment, any of various known luminous pigments may be used. For example, Lumi Nova G-300C, G-300M or G-300FFS produced by Nemoto & Co., Ltd. or Ultra Glow NP2820 produced by Nichia Corporation may be used.

The metallic pigment may be made of aluminum, silver or gold, for instance. The gold pigment may be S Type produced by Ishifuku Metal Industry Co., Ltd. The silver pigment may be RH Type produced by Ishifuku Metal Industry Co., Ltd. And the aluminum pigment may be STAPA™ leafing series, STAPA™ Metallic series or STANDART™ PC series produced by Eckart Corporation may be used, for example.

The glass pigment may be made of mica or glass silicate. For example, Crystal Star™ GF2125 or GF2525 produced by Toyo Aluminum KK or Meta Shine™ 2025PS produced by Nippon Sheet Glass may be used. Alternatively, another glass pigment called "Pearl Pigment" may also be used. The Pearl Pigment is formed by coating mica with aluminum, titanium dioxide, an iron oxide or any other suitable material. As the Pearl Pigment, Mearlin Magna Pearl 2000 produced by Engelhard Corporation may be used, for example.

Optionally, to increase the decoration effect, the decoration layer 3 may also be colored with the addition of not only the luminous pigment or any other pigment described above but also a normal coloring pigment as well. By using a mixture of a heat resistant ink disclosed in Japanese Laid-Open Patent Publication No. 2002-275405 and a luminous pigment, a metallic pigment or a glass pigment, a colored decoration layer 3 can be formed. Alternatively, the decoration layer 3 may even include only the coloring pigment with no pigment to achieve special decoration effect (such as the luminous pigment described above). The decoration layer 3 may be formed by a printing process, for example.

The two resin layers 4a and 4b that sandwich the decoration layer 3 between them are preferably made of a resin material that has a lower load deflection temperature (which is also called a "thermal deformation temperature") than the resin material of the base member 1. Typically, the resin layers 4a and 4b are made of a thermoplastic resin.

When the decorative sheet 10 is attached to a formed product, an adhesive 8 is applied onto the resin layer 4b as indicated by the dotted line in FIG. 1. As the adhesive 8, a urethane or acrylic adhesive is preferably used.

The decorative sheet 10 with such a structure may be used in a forming process as disclosed in Japanese Laid-Open Patent Publication No. 2005-153351 and can be used effectively to decorate a formed product with a very rugged surface.

In the decorative sheet 10 of this preferred embodiment, two resin layers 4a and 4b are arranged so as to sandwich the decoration layer 3 between them. These resin layers 4a and 4b are preferably made of a resin material that has a lower load deflection temperature than the resin material of the base member 1. That is why when stress is applied to the resin layers 4a and 4b while the decorative sheet 10 is being formed or bonded, the resin layers 4a and 4b are deformed and stretched more easily than the base member 1. Consequently, while the decorative sheet 10 is being stretched or is shrinking, these resin layers 4a and 4b are deformed and stretched so as to reduce the stress applied to the decoration layer 3 and function as a sort of cushion so to speak. As a result, cracks in the decoration layer 3 can be minimized. In addition, since there is no need to reduce the thickness of the decoration layer 3, a good amount of pigment can be included in the decoration layer 3. For that reason, the decoration layer 3 achieves a sufficient decoration effect. For example, a decoration layer 3 with a luminous pigment can produce luminescence at a sufficiently high intensity for a long time.

Figure 2A:
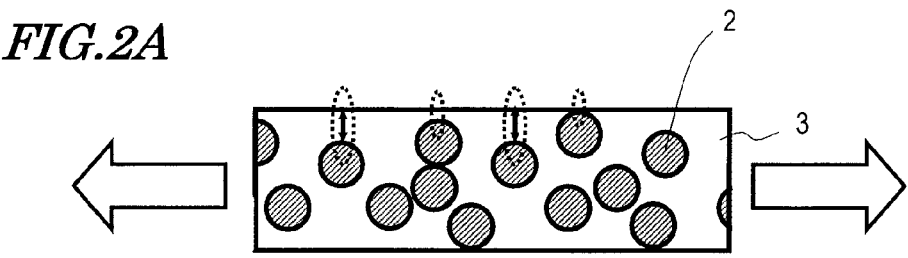
FIGS. 2A, 2B and 2C show why cracks in a decoration layer can be minimized by providing two resin layers that sandwich the decoration layer.
Figure 2B:
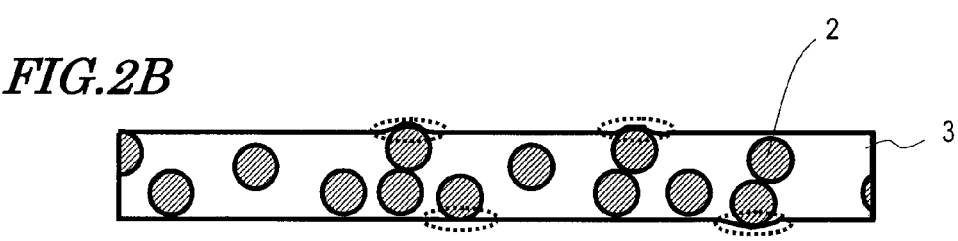
Figure 2C:
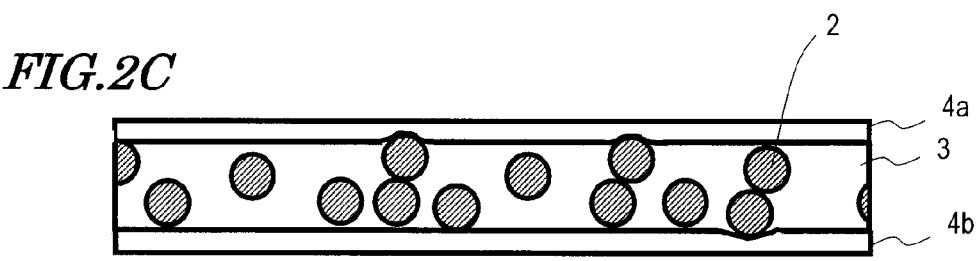

Hereinafter, it will be described in further detail with reference to FIGS. 2A through 2C why the cracks can be minimized by providing the resin layers 4a and 4b. FIG. 2A illustrates the decoration layer 3 yet to be formed (i.e., before the decorative sheet 10 is attached), while FIGS. 2B and 2C illustrate the decoration layer 3 that has already been formed. More specifically, FIG. 2B shows a situation where there are no resin layers 4a, 4b to sandwich the decoration layer 3. On the other hand, FIG. 2C shows a situation where the resin layers 4a and 4b are arranged so as to sandwich the decoration layer 3 between them.

As shown in FIG. 2A, pigment particles 2 are dispersed in the decoration layer 3, and therefore, located at various distances from the interface (i.e., the interface between the decoration layer 3 and its adjacent layer) as encircled in dots in FIG. 2A. That is why the resin portion between the interface and the pigment particles 2 located near the interface is so thin as to receive greater stress than any other region when the decoration layer 3 is stretched in the directions pointed by the arrows in FIG. 2A in a forming process.

Consequently, without the resin layers 4a and 4b as shown in FIG. 2B, the decorative sheet would start to crack at the interfacial regions where the pigment particles 2 are located as encircled in dots in FIG. 2B.

On the other hand, in a situation where the resin layers 4a and 4b are arranged so as to sandwich the decoration layer 3 between them as shown in FIG. 2C, the resin layers 4a and 4b with a lower load deflection temperature than the base member 1 would stretch preferentially and distribute the stress at the interfacial regions during the stretching process. As a result, cracks can be minimized.

Figure 3:
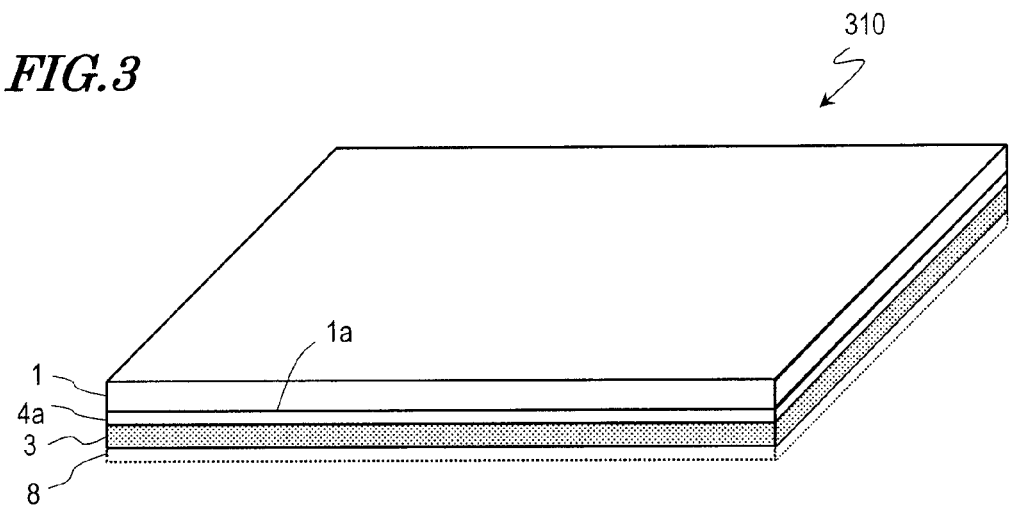
FIG. 3 is a perspective view schematically illustrating a decorative sheet 310 including a resin layer on only one side of the decoration layer.

Optionally, to relieve the stress on the decoration layer 3, the resin layer 4a could be provided on only one side of the decoration layer 3 as in the decorative sheet 310 shown in FIG. 3. However, such an arrangement could not reduce cracks in the decoration layer 3 sufficiently as will be described in detail later. By arranging two resin layers 4a and 4b that sandwich the decoration layer 3 as in the decorative sheet 10 of this preferred embodiment, the stress at the interface where the sheet could start to crack can be reduced and cracks in the decoration layer 3 can be minimized effectively on both sides of the decoration layer 3. On the other hand, if the resin layer 4a were provided on only one side of the decoration layer 3 as shown in FIG. 3, cracks would still be produced at the interface on the other side of the decoration layer 3 with no resin layers.

To reduce the stress at the interface even more effectively, the load deflection temperature of the resin material of the resin layers 4a and 4b is preferably lower by at least about 10° C. than that of the resin material of the base member 1. However, if the load deflection temperature were too low, then the resin layers 4a and 4b would flow too easily due to the pressure applied during forming (or bonding). For that reason, the difference in load deflection temperature between the resin material of the resin layers 4a and 4b and that of the base member 1 is preferably about 40° C. or less. That is to say, the load deflection temperature of the resin material of the resin layers 4a and 4b is preferably lower than that of the resin material of the base member 1 by about 10° C. to about 40° C.

More specifically, the resin material of the resin layers 4a and 4b preferably has a load deflection temperature of about 30° C. to about 85° C. This load deflection temperature range is preferred for the following reasons. If the load deflection temperature exceeded about 85° C., then the resin layers 4a and 4b being bonded could not be deformed or stretched sufficiently. On the other hand, if the load deflection temperature were less than about 30° C., then the resin layers 4a and 4b would flow too easily under the pressure applied during the forming (or bonding) process. As used herein, the load deflection temperature is measured under a load of about 0.45 MPa compliant with the ASTM D648 standard.

Specifically, the resin layers 4a and 4b may be made of an acrylic resin or an acrylic-urethane resin. The resin layers 4a and 4b may be made of either the same resin material or mutually different resin materials.

Each of the resin layers 4a and 4b preferably has a thickness of about 3 µm to about 10 µm. This thickness range is preferred for the following reasons. Specifically, if the thickness were less than about 3 µm, the function of reducing the stress could not be performed satisfactorily and cracks in the decoration layer 3 could not be reduced sufficiently. On the other hand, if the thickness were more than about 10 µm, then the resin layers 4a and 4b would wrinkle easily during the forming process.

The resin layer 4a located between the decoration layer 3 and the base member 1 is preferably thinner than the resin layer 4b located on the opposite side of the decoration layer 3 from the resin layer 4a. In other words, when the decorative sheet 10 is attached, the outer resin layer 4a is preferably thinner than the inner resin layer 4b. By adopting such an arrangement, after the decorative sheet has been attached, the decoration layer 3 can be even closer to the uppermost surface, and therefore, the decoration effect is achieved more easily by the decoration layer 3.

The pigment included in the decoration layer 3 preferably has a mean particle size of about 5 µm to about 40 µm. This particle size range is preferred for the following reasons. Specifically, if the pigment had a mean particle size of less than about 5 µm, then the decoration effect could not be achieved fully and the decoration layer 3 might crack easily. For example, in a luminous pigment, the luminescence produced by respective particles of the luminous pigment would weaken. But if the amount of the luminous pigment were increased to realize sufficient intensity, then the decoration layer 3 would crack easily. On the other hand, if the mean particle size of the pigment exceeded about 40 µm, then it would be difficult to form the decoration layer 3 by a printing process.

The decoration layer 3 including the luminous pigment preferably has a thickness of about 40 µm to about 80 µm. This thickness range is preferred for the following reasons. Specifically, if the decoration layer 3 had a thickness of less than about 40 µm, the amount of the luminous pigment included in the decoration layer 3 might be too small to maintain luminescence at a sufficiently high intensity for a long time. Naturally, if the percentage of the luminous pigment in the decoration layer 3 were increased, then the amount of the luminous pigment could be increased but the decoration layer 3 would crack easily in that case. On the other hand, if the thickness of the decoration layer 3 exceeded about 80 µm, then the tensile strength of the decoration layer 3 would be greater than that of the base member 1, thus possibly making it difficult to form the decoration layer 3 into its intended shape. In other words, if the thickness of the decoration layer 3 is determined such that the base member 1 has greater tensile strength than the decoration layer 3, the formability improves.

The content of the luminous pigment in the decoration layer 3 is preferably set so as to make the luminescence produced by the decorative sheet 10 easily sensible at night or in the dark. More specifically, the content is preferably set to make the decorative sheet 10 produce luminescence at an intensity of about 5 mcd/m$^2$ or more.

The decoration layer 3 with a thickness of about 40 μm to about 80 μm preferably includes about 75 wt % to about 80 wt % of the luminous pigment. By setting the content of the luminous pigment within this range, a sufficiently high intensity of about 5 mcd/m$^2$ is realized with cracks in the decoration layer 3 minimized.

Figure 4:
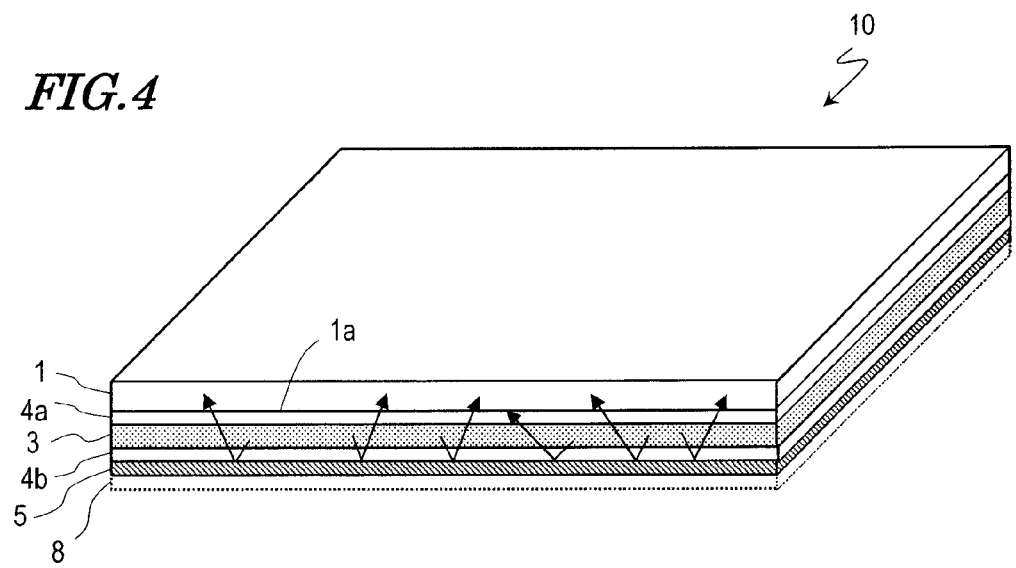
FIG. 4 is a perspective view schematically illustrating an alternative arrangement for a decorative sheet 10 according to another preferred embodiment of the present invention.

Also, if the decoration layer 3 includes a luminous pigment, the decorative sheet 10 preferably further includes a light reflective layer 5 on the opposite side of the decoration layer 3 from the base member 1 as shown in FIG. 4. The light is emitted from the decoration layer 3 not just toward, but also away from, the base member 1. However, by providing the light reflective layer 5, the light that has gone away from the base member 1 can be reflected back toward the base member 1. As a result, the light can be used more efficiently, the intensity can be increased, and the luminescence can be maintained for a longer time.

The light reflective layer 5 may be either a metal layer made of a metallic material with high optical reflectance or a layer including a white pigment such as titanium oxide or silicon dioxide (e.g., a resin layer). If such a layer including a white pigment is used as the light reflective layer, the formability will improve compared to the situation where the metal layer is used. As a result, a thick light reflective layer can be formed and the reflectance can be increased significantly.

To reflect the light that has come from the decoration layer 3 efficiently, the light reflective layer 5 preferably has a thickness of about 5 μm or more. With the addition of a filler, the light reflective layer 5 would wrinkle much less. To realize good formability, however, the light reflective layer 5 preferably has a thickness of about 20 μm or less.

The white pigment preferably has as small a mean particle size as about 1 μm or less. For example, by adding about 10 wt % to about 50 wt % of white pigment with a mean particle size of approximately 0.25 μm to the resin material, a preferred light reflective layer 5 can be obtained.

Figure 5:
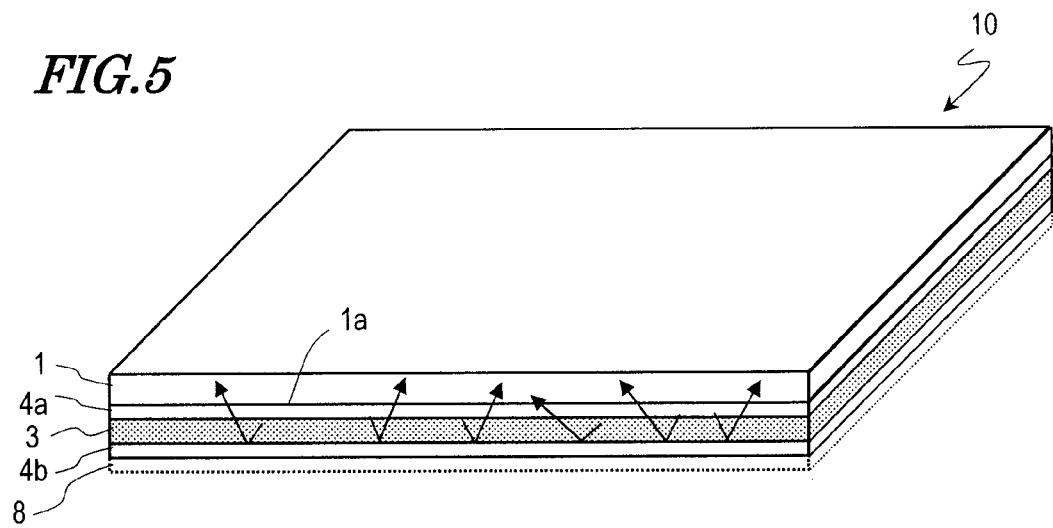
FIG. 5 is a perspective view schematically illustrating another alternative arrangement for a decorative sheet 10 according to still another preferred embodiment of the present invention.

In the arrangement shown in FIG. 4, the light reflective layer 5 is provided separately from the resin layers 4a and 4b that sandwich the decoration layer 3 between them. Alternatively, the resin layer 4b that is located on the opposite side of the decoration layer 3 from the base member 1 may function as a light reflective layer as shown in FIG. 5. In that case, the overall thickness of the decorative sheet 10 can be reduced. In addition, since the process step of forming an additional light reflective layer can be omitted, the manufacturing process of the decorative sheet 10 can be simplified.

To make the resin layer 4b function as a light reflective layer, particles with light reflecting property (e.g., a white pigment) may be added to the resin material of the resin layer 4b. If the resin layer 4b is made to function as a light reflective layer, too, then the resin layer 4b preferably has a thickness of about 5 μm to about 20 μm for the same reasons as those described for the light reflective layer 5 shown in FIG. 4.

Furthermore, the decoration layer 3 including a metallic pigment preferably has a thickness of about 7 μm to about 60 μm. This thickness range is preferred for the following reasons. Specifically, if the thickness of the decoration layer 3 were less than about 7 μm, the amount of the metallic pigment included in the decoration layer 3 might be too small to achieve sufficient decoration effect. Naturally, if the percentage of the metallic pigment in the decoration layer 3 were increased, then the amount of the metallic pigment could be increased but the decoration layer 3 would crack easily in that case. On the other hand, if the thickness of the decoration layer 3 exceeded about 60 μm, then the tensile strength of the decoration layer 3 would be greater than that of the base member 1, thus possibly making it difficult to form the decoration layer 3 into its intended shape.

The content of the metallic pigment in the decoration layer 3 is preferably set so as to achieve the decoration effect fully. More specifically, the content of the metallic pigment in the decoration layer 3 with a thickness of about 7 μm to about 60 μm is preferably about 5 wt % to about 80 wt %. By setting the content of the metallic pigment within such a range, sufficient decoration effect is achieved with cracks in the decoration layer 3 minimized.

Furthermore, the decoration layer 3 including a glass pigment preferably has a thickness of about 7 μm to about 60 μm. This thickness range is preferred for the following reasons. Specifically, if the thickness of the decoration layer 3 were less than about 7 μm, the amount of the glass pigment included in the decoration layer 3 might be too small to achieve sufficient decoration effect. Naturally, if the percentage of the glass pigment in the decoration layer 3 were increased, then the amount of the glass pigment could be increased but the decoration layer 3 would crack easily in that case. On the other hand, if the thickness of the decoration layer 3 exceeded about 60 μm, then the tensile strength of the decoration layer 3 would be greater than that of the base member 1, thus possibly making it difficult to form the decoration layer 3 into its intended shape.

The content of the glass pigment in the decoration layer 3 is preferably set so as to achieve the decoration effect fully. More specifically, the content of the glass pigment in the decoration layer 3 with a thickness of about 7 μm to about 60 μm is preferably about 5 wt % to about 35 wt %. By setting the content of the glass pigment within such a range, sufficient decoration effect is achieved with cracks in the decoration layer 3 minimized.

Figure 6:
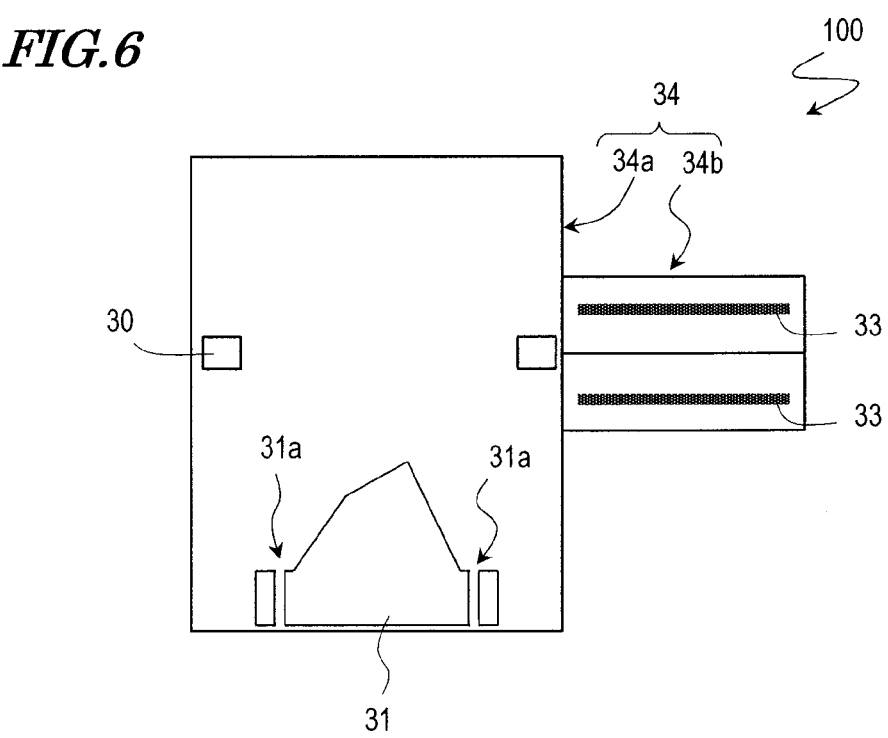
FIG. 6 schematically illustrates a vacuum forming system for use to decorate a formed product with the decorative sheet 10.

Hereinafter, it will be described with reference to FIGS. 6, 7A, 7B, 8A, 8B, 9A, 9B and 9C how to decorate a formed product with the decorative sheet 10. FIG. 6 schematically illustrates a vacuum forming system 100 for use to decorate a formed product with the decorative sheet 10. FIGS. 7A through 9C are cross-sectional views schematically illustrating forming processing steps that use the vacuum forming system 100.

The vacuum forming system 100 shown in FIG. 6 includes a gripping frame 30 to grip the decorative sheet 10 thereon, a supporting stage 31 for supporting a formed product thereon, a heater (such as a far-infrared heater) 33 for heating the decorative sheet 10, and a vacuum vessel 34 that stores all of these members.

The vacuum vessel 34 includes a main vessel 34a that stores the gripping frame 30 and the supporting stage 31, and a sub-vessel 34b that stores the heater 33. When the decorative sheet 10 is heated, the heater 33 is introduced into the main vessel 34a.

The supporting stage 31 has a plurality of openings 31a, through which the air inside the main vessel 34a can be exhausted. Although not shown in FIG. 6, a mechanism for introducing a gas from outside of this system into the main vessel 34a (e.g., a hose connected to outside) is also provided for the main vessel 34a.

Using this vacuum forming system 100, a formed product may be decorated with the decorative sheet 10 in the following manner, for example.

Figure 7A:
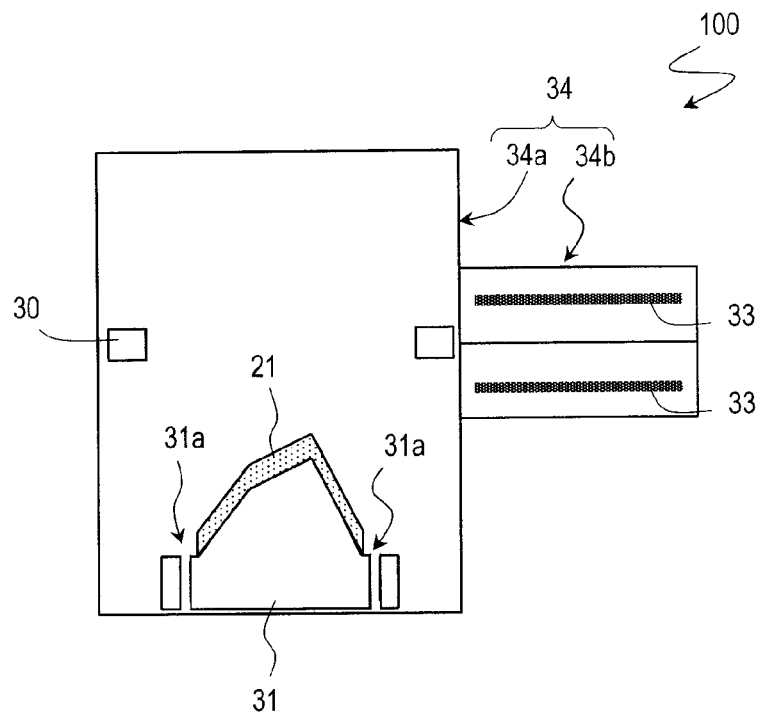
FIGS. 7A and 7B are cross-sectional views schematically illustrating forming processing steps using the vacuum forming system shown in FIG. 6.

First, as shown in FIG. 7A, a formed product body 21 is provided and mounted on the supporting stage 31. The formed product body 21 may be made of a resin material, a metallic material or any other suitable material by a known technique. For example, the formed product body 21 may be made of a resin material by an injection molding process.

Figure 7B:
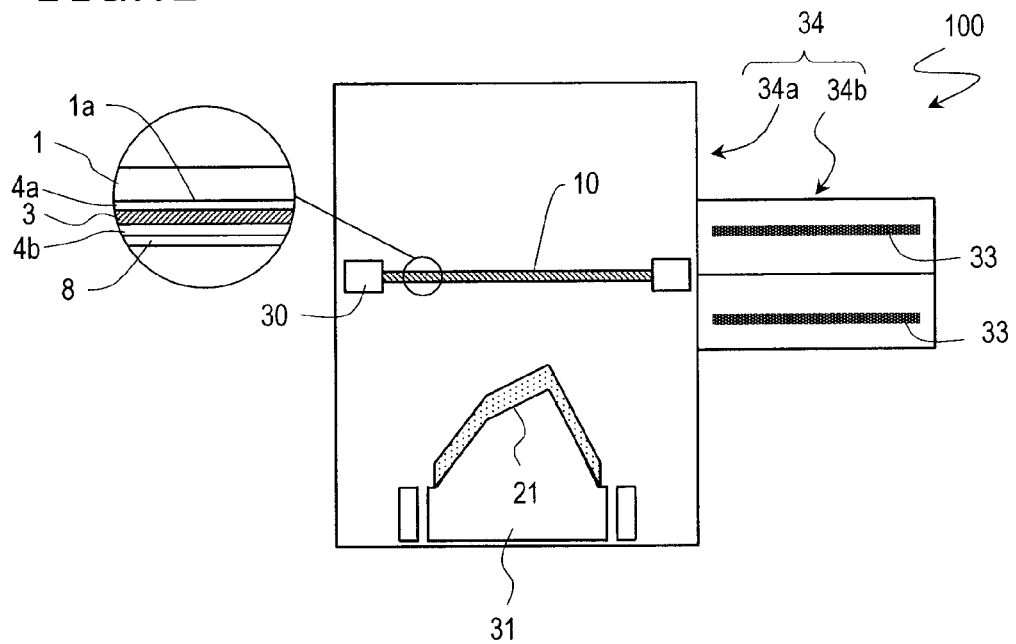

Thereafter, as shown in FIG. 7B, a decorative sheet 10 is provided and fixed onto the gripping frame 30. As partially enlarged in FIG. 7B, the decorative sheet 10 includes two resin layers 4a and 4b, which are arranged so as to sandwich the decoration layer 3 between them.

Figure 8A:
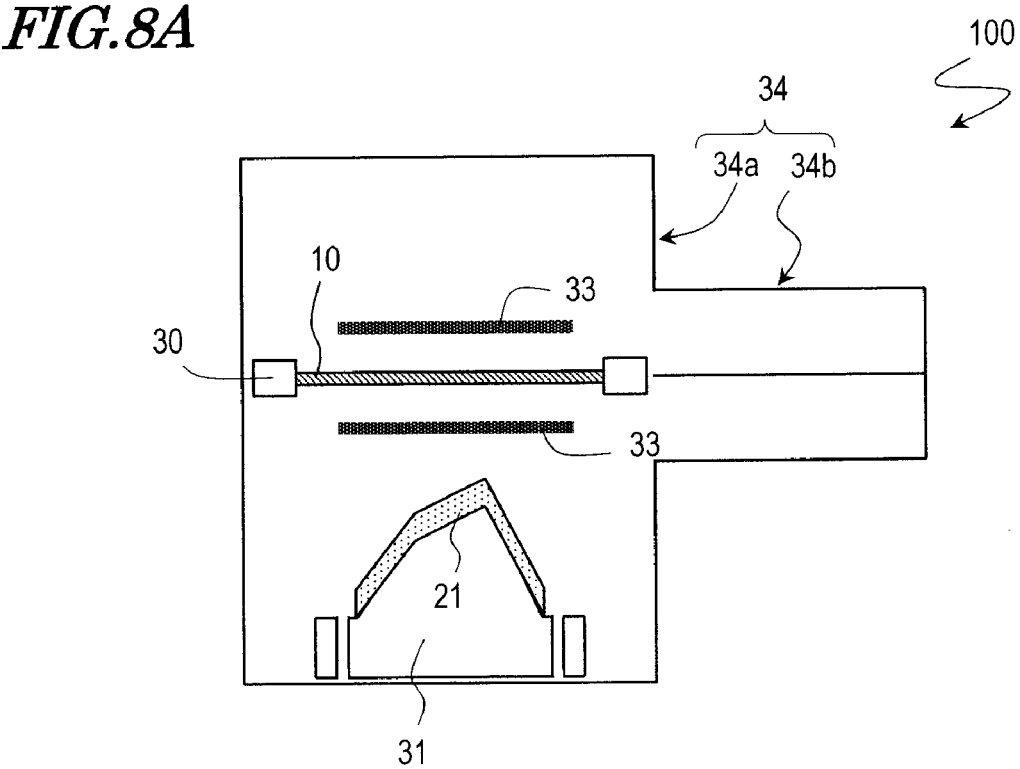
FIGS. 8A and 8B are cross-sectional views schematically illustrating forming processing steps using the vacuum forming system shown in FIG. 6.

Subsequently, as shown in FIG. 8A, the decorative sheet 10 is heated with the heater 33, thereby softening the decorative sheet 10. In this process step, the decorative sheet 10 is preferably heated to a temperature of approximately $(T_A-40)$ ° C. to $(T_A+20)$ ° C., where $T_A$ is the load deflection temperature of the base member 1. This range is preferred for the following reasons. Specifically, if the decorative sheet 10 were heated to a temperature lower than $(T_A-40)$ ° C., then the base member 1 would not be deformed easily and could crack when bonded to the formed product and formed into a desired shape or could even be non-formable at all. On the other hand, if the decorative sheet 10 were heated to a temperature higher than $(T_A+20)$ ° C., the sheet being heated could stretch too much to be formed into a desired shape. Typically, the decorative sheet 10 is heated to a temperature that is equal to or higher than the load deflection temperature $T_A$ of the base member 1. Also, in this process step, the decorative sheet 10 is preferably heated to a temperature that is approximately 20 to 30° C. higher than the lowest adhesion temperature of the adhesive 8 to ensure good adhesiveness for the adhesive 8.

Figure 8B:
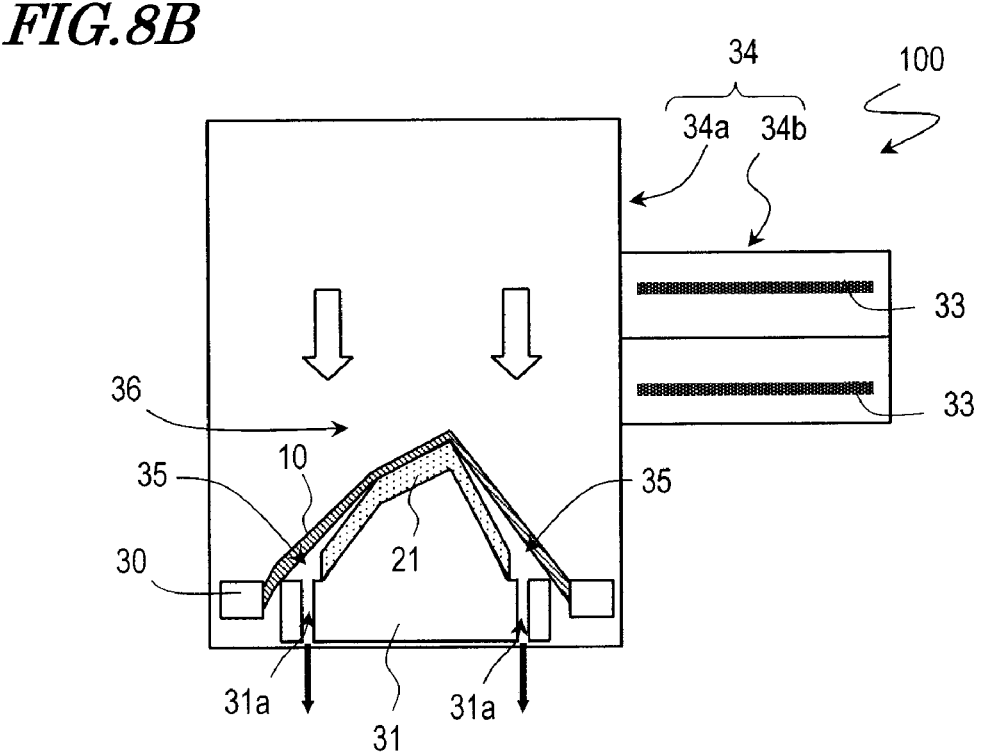
Figure 9A:
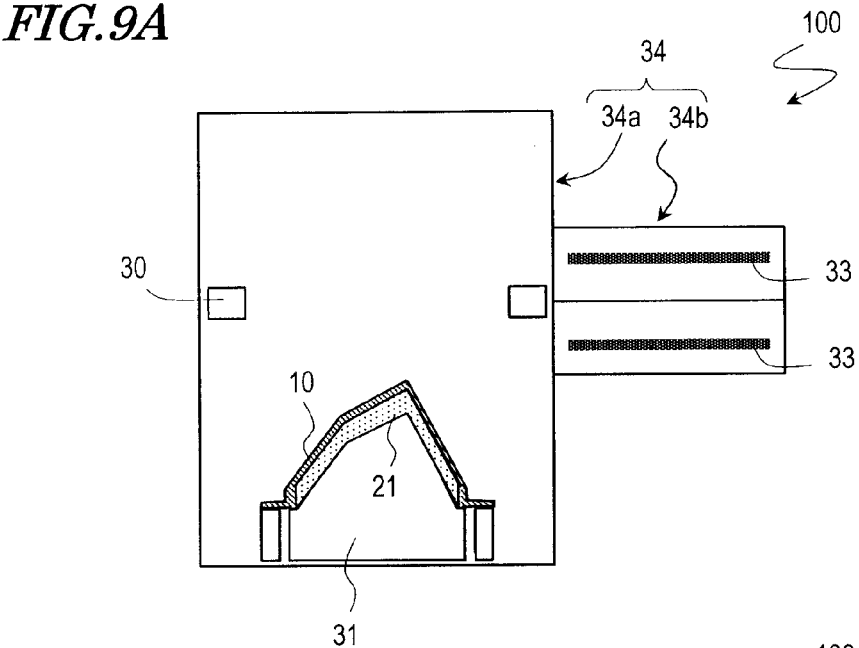
FIGS. 9A, 9B and 9C are cross-sectional views schematically illustrating forming processing steps using the vacuum forming system shown in FIG. 6.

Thereafter, as shown in FIG. 8B, the decorative sheet 10 is brought down toward the formed product 21 and then the pressure in the space 35 between the decorative sheet 10 and the formed product 21 is reduced, thereby bonding the decorative sheet 10 onto the formed product 21 as shown in FIG. 9A. If the pressure in the space 35 between the decorative sheet 10 and the formed product 21 is reduced, then the decorative sheet 10 will be pressed against the formed product 21 with uniform pressure. As a result, the sheet 10 can be bonded to the product 21 effectively.

In this preferred embodiment, the space 36 over the decorative sheet 10 is also pressurized, thereby making an even bigger pressure difference. Consequently, the decorative sheet 10 can be bonded even more quickly. The pressure in the space 35 may be reduced by exhausting the air in the space 35 through the openings 31a of the supporting stage 31 using a vacuum pump, for example. On the other hand, the pressure in the space 36 may be increased by supplying compressed air thereto using a compressor, for example. In this bonding process step, the decorative sheet 10 is stretched and formed so as to fit the surface shape of the formed product 21 closely.

Figure 9B:
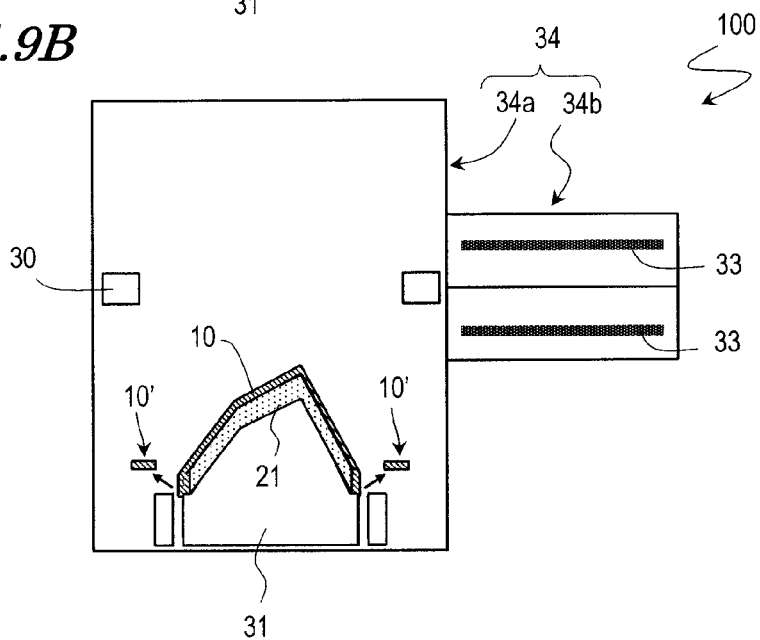
Figure 9C:
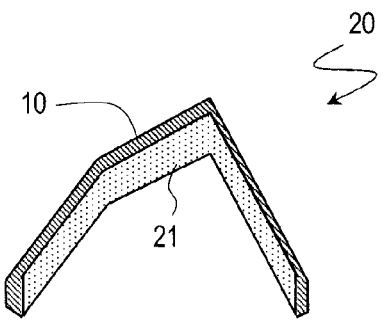

Subsequently, as shown in FIG. 9B, an excessive portion 10' of the decorative sheet 10 is trimmed with a rotating blade or any other cutter, and then the formed product 21 is removed from the supporting stage 30, thereby completing a formed product 20 with a decorated surface as shown in FIG. 9C.

By using the decorative sheet 10 of this preferred embodiment, it is possible to prevent the decoration layer 3 from cracking, and therefore, a formed product can be decorated without diminishing the beauty of its appearance. For that reason, the decorative sheet 10 can be used effectively to decorate a formed product with significant ruggedness, e.g., to decorate a deep-drawn formed product. The present invention is effective in a situation where the decorative sheet 10 is stretched and has its thickness reduced to a certain degree during the forming process for bonding the decorative sheet 10. More particularly, the present invention is especially effective if the attached decorative sheet 10 has portions, of which the thicknesses are about 30% to about 40% as thick as the thickest portion thereof.

Figure 10:
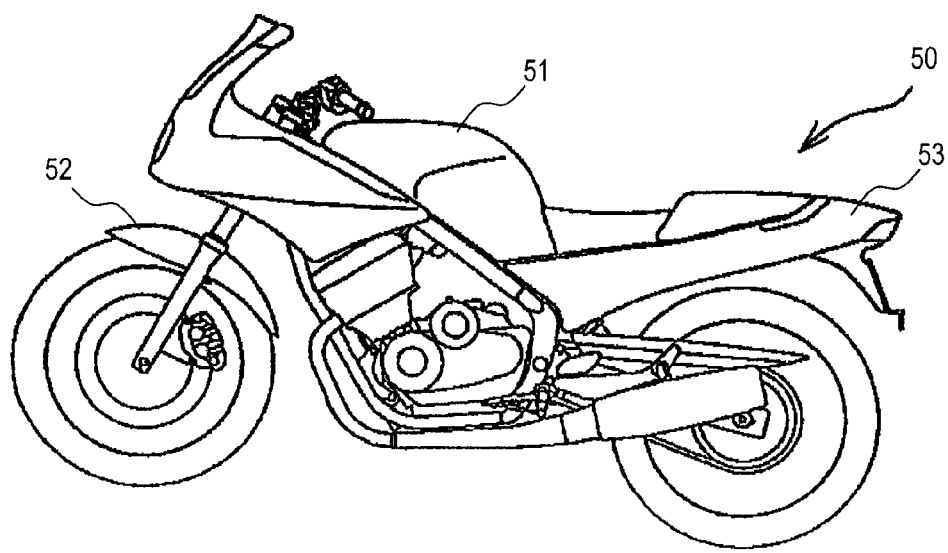
FIG. 10 is a side view schematically illustrating a motorcycle.
Figure 11:
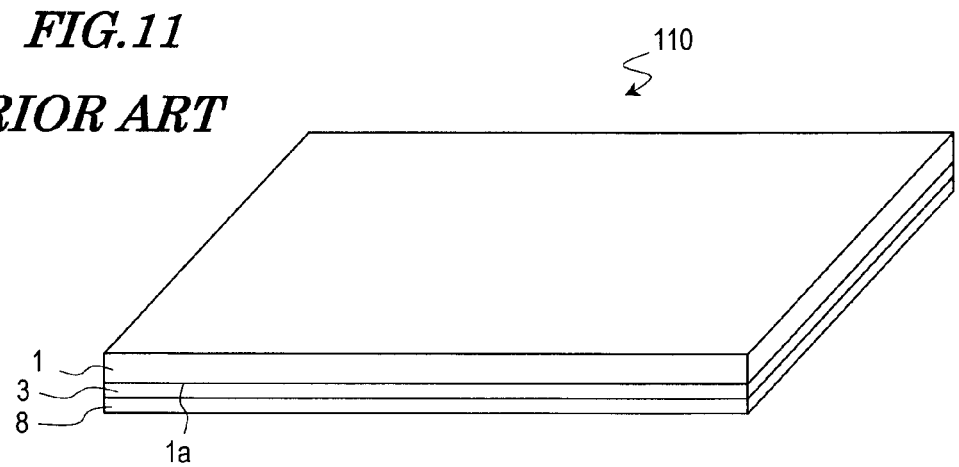
FIG. 11 is a perspective view schematically illustrating a conventional decorative sheet 110 for use to decorate a formed product.
Figure 12A:
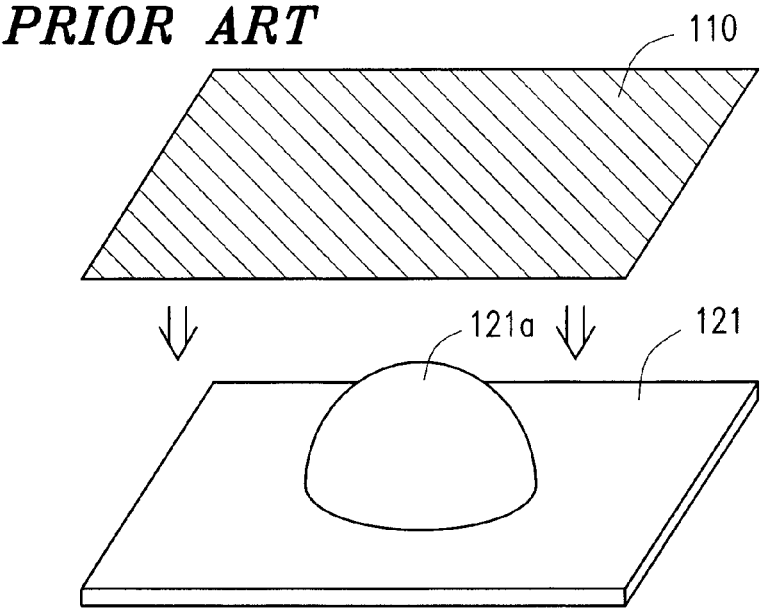
FIGS. 12A, 12B and 12C schematically illustrate a process of decorating a formed product with a decorative sheet.
Figure 12B:
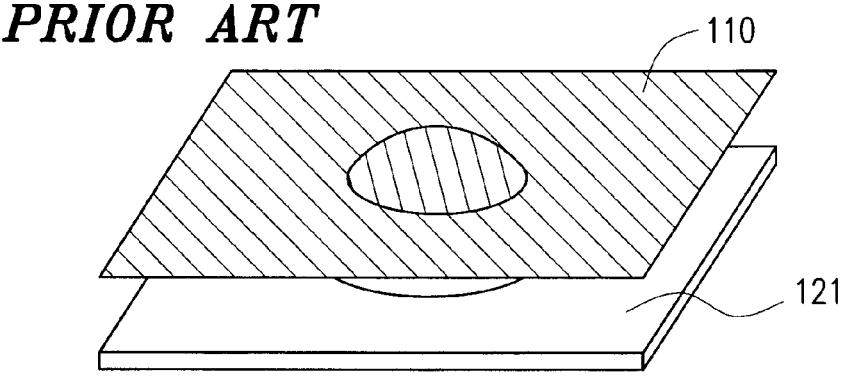
Figure 12C:
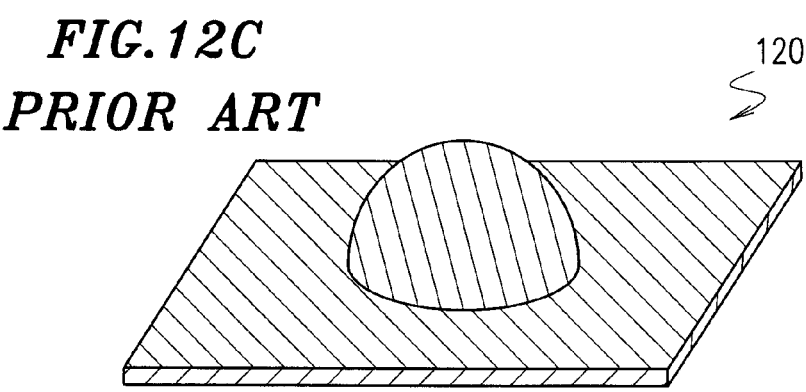
Figure 13:
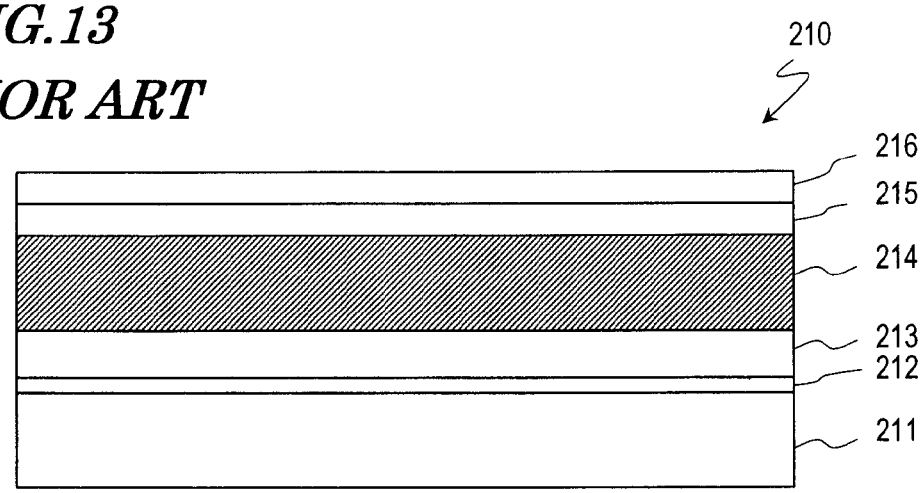
FIG. 13 is a cross-sectional view schematically illustrating a conventional transfer film 210 for decorating an object with a luminous pigment.
Figure 14:
FIG. 14 is a cross-sectional view schematically illustrating a multilayer structure including a luminescent coating layer, which has been transferred onto an object using s transfer film.

A formed product decorated with the decorative sheet 10 of this preferred embodiment can be used effectively as an interior or exterior member for various types of transportation apparatuses or as an exterior member for a consumer electronic appliance. For example, the formed product can be used effectively as the tank housing 51, the front fender 52 or the tail cowl 53 of a motorcycle 50 as shown in FIG. 10.

Also, in the formed product decorated with the decorative sheet 10 of this preferred embodiment, the decoration layer 3 is protected by the base member 1 and can maintain fine appearance for a long time. For that reason, the formed product decorated with the decorative sheet 10 can be used outdoors particularly effectively in ships, outboard engines, water vehicles, all terrain vehicles (ATVs), snowmobiles, two wheelers, and golf cars.

The present inventors actually decorated a formed product with a decorative sheet 10 according to this preferred embodiment and evaluated its appearance. Hereinafter, the results will be described as specific examples of the present invention. In these examples, a luminous pigment was used. However, almost the same results were obtained even when a metallic pigment or a glass pigment was used.

The decoration effect of the decoration layer 3 (specifically, the quality of the luminescence produced by the decoration layer 3) and the appearance of the decoration layer 3 (specifically, the degree of cracking of the decoration layer 3) were evaluated with the mean particle size (μm) and content (wt %) of the luminous pigment, the thickness (μm) of the decoration layer 3, and the thicknesses of the resin layers 4a, 4b varied. The results are shown in the following Table 1, in which the resin layer 4a arranged on one side of the decoration layer 3 in contact with the base member 1 is referred to as a "first resin layer" and the resin layer 4b arranged on the other side of the decoration layer 3 opposite to the base member 1 a "second resin layer". The second resin layer 4b includes about 30 wt % of titanium oxide particles with a mean particle size of about 0.25 μm and functions as a light reflective layer.

The decoration effect and the appearance of the decoration layer 3 were rated in the three grades GOOD, FAIR and BAD. The degree of cracking of the decoration layer 3 was observed in its portion that was stretched about 250%. Specifically, GOOD indicates that cracking was sufficiently reduced and the decorative sheet had good appearance, FAIR indicates that no cracking was sensed but the decorative sheet had color unevenness, and BAD indicates that the decorative sheet cracked and had bad appearance.

Table 1 also shows, as comparative examples, the results of the decorative sheet 310 including the resin layer 4a on only one side of the decoration layer 3 as shown in FIG. 3.

TABLE 1

|  | Mean particle size of luminous pigment | Content of luminous pigment | Thickness of decoration layer | Thickness of first resin layer | Thickness of second resin layer | Decoration effect of decoration layer | Appearance of decoration layer |
| --- | --- | --- | --- | --- | --- | --- | --- |
| Cmp. Ex. 1 | 30 μm | 75 wt % | 30 μm | 15 μm | — | BAD | GOOD |
| Cmp. Ex. 2 | 30 μm | 75 wt % | 60 μm | 15 μm | — | GOOD | BAD |
| Cmp. Ex. 3 | 30 μm | 75 wt % | 60 μm | 30 μm | — | GOOD | BAD |
| Ex. 1 | 50 μm | 75 wt % | 60 μm | 5 μm | 10 μm | GOOD | FAIR |
| Ex. 2 | 40 μm | 75 wt % | 60 μm | 5 μm | 10 μm | GOOD | GOOD |
| Ex. 3 | 30 μm | 75 wt % | 60 μm | 5 μm | 10 μm | GOOD | GOOD |
| Ex. 4 | 30 μm | 75 wt % | 60 μm | 3 μm | 10 μm | GOOD | GOOD |
| Ex. 5 | 30 μm | 75 wt % | 60 μm | 3 μm | 5 μm | GOOD | GOOD |
| Ex. 6 | 30 μm | 75 wt % | 60 μm | 10 μm | 20 μm | GOOD | GOOD |
| Ex. 7 | 30 μm | 75 wt % | 80 μm | 5 μm | 10 μm | GOOD | GOOD |
| Ex. 8 | 30 μm | 80 wt % | 80 μm | 5 μm | 15 μm | GOOD | GOOD |
| Ex. 9 | 30 μm | 90 wt % | 80 μm | 5 μm | 15 μm | GOOD | FAIR |
| Ex. 10 | 7 μm | 75 wt % | 60 μm | 5 μm | 10 μm | GOOD | GOOD |
| Ex. 11 | 5 μm | 75 wt % | 60 μm | 5 μm | 10 μm | GOOD | FAIR |
| Ex. 12 | 5 μm | 75 wt % | 40 μm | 5 μm | 10 μm | GOOD | GOOD |
| Ex. 13 | 5 μm | 67 wt % | 40 μm | 5 μm | 10 μm | FAIR | GOOD |
| Ex. 14 | 1 μm | 75 wt % | 40 μm | 5 μm | 10 μm | GOOD | FAIR |

As can be seen from the results of Comparative Examples #2 and #3 shown in Table 1, even if the resin layer 4a was provided on only one side of the decoration layer 3, cracking of the decoration layer 3 could not minimized. The results of Comparative Example #1 also reveal that if the decoration layer 3 was thin, cracking could be minimized but the luminescence could not be produced at a sufficiently high intensity for a long time.

On the other hand, as can be seen from the results of Examples #1 through #14 of the present invention, if the resin layers 4a and 4b were arranged on both sides of the decoration layer 3 (i.e., so as to sandwich the decoration layer 3 between them), the decoration layer 3 including the luminous pigment could produce luminescence at a sufficiently high intensity for a long time and cracking of the decoration layer 3 could be minimized.

Comparing the results of Examples #1 and #14 to those of the other examples, it can also be seen that to minimize cracks in the decoration layer 3, the luminous pigment preferably has a mean particle size of about 5 μm to about 40 μm.

Furthermore, comparing the results of Examples #9 and #13 to those of the other examples, it can also be seen that the content of the luminous pigment is preferably about 75 wt % to about 80 wt %.

Moreover, as can be seen from the results of Examples #1 through #14, good results were obtained if the decoration layer 3 had a thickness of about 40 μm to about 80 μm, if the first resin layer 4a had a thickness of about 3 μm to about 10 μm, and if the second resin layer 4b also functioning as a light reflective layer had a thickness of about 5 μm to about 20 μm.

According to various preferred embodiments of the present invention, a decorative sheet, which can make its decoration layer, including a pigment, achieve a good decoration effect and which can reduce cracks in the decoration layer, is provided.

A formed product decorated with the decorative sheet according to preferred embodiments of the present invention has such a fine appearance as to be used effectively as an exterior or interior member for various types of transportation apparatuses including passenger cars, buses, trucks, motorcycles, tractors, airplanes, motorboats, and civil engineering vehicles or as an exterior member for numerous types of consumer electronic appliances.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2006-139584 filed on May 18, 2006, the entire contents of which are hereby incorporated by reference. Furthermore, the entire contents of Japanese Patent Application No. 2007-126673 filed on May 11, 2007, are hereby incorporated by reference.

What is claimed is:

1. A decorative sheet comprising:
   a base member made of a resin material;
   a decoration layer, which is supported by the base member and which includes a pigment; and
   at least two resin layers, which are arranged so as to sandwich the decoration layer between them; wherein
   the at least two resin layers are made of a resin material that has a lower load deflection temperature than the resin material of the base member; and
   the decoration layer includes the pigment dispersed in a resin material.

2. The decorative sheet of claim 1, wherein the load deflection temperature of the resin material of the at least two resin layers is lower by at least about 10° C. than that of the resin material of the base member.

3. The decorative sheet of claim 1, wherein the at least two resin layers are made of a resin material, of which the load deflection temperature is about 30° C. to about 85° C. when measured at a load of about 0.45 MPa compliant with the ASTM D648 standard.

4. The decorative sheet of claim 1, wherein the tensile strength of the base member is greater than that of the decoration layer.

5. The decorative sheet of claim 1, wherein each of the at least two resin layers has a thickness of about 3 μm to about 10 μm.

6. The decorative sheet of claim 1, wherein the at least two resin layers include a first resin layer, which is located between the decoration layer and the base member, and a second resin layer, which is located on an opposite side of the decoration layer from the first resin layer, and the first resin layer is thinner than the second resin layer.

7. The decorative sheet of claim 1, wherein the pigment has a mean particle size of about 5 μm to about 40 μm.

8. The decorative sheet of claim 1, wherein the pigment is a luminous pigment.

9. The decorative sheet of claim 8, wherein the decoration layer has a thickness of about 40 μm to about 80 μm.

10. The decorative sheet of claim 9, wherein the decoration layer includes about 75 wt % to 80 wt % of the luminous pigment.

11. The decorative sheet of claim 8, further comprising a light reflective layer, which is arranged on an opposite side of the decoration layer from the base member.

12. The decorative sheet of claim 11, wherein the light reflective layer includes a white pigment.

13. The decorative sheet of claim 11, wherein one of at least the two resin layers that is located on an opposite side of the decoration layer from the base member also functions as the light reflective layer.

14. The decorative sheet of claim 11, wherein the light reflective layer has a thickness of about 5 μm to about 20 μm.

15. The decorative sheet of claim 1, wherein the pigment is a metallic pigment.

16. The decorative sheet of claim 15, wherein the decoration layer has a thickness of about 7 μm about 60 μm.

17. The decorative sheet of claim 16, wherein the decoration layer includes about 5 wt % to about 80 wt % of the metallic pigment.

18. The decorative sheet of claim 1, wherein the pigment is a glass pigment.

19. The decorative sheet of claim 18, wherein the decoration layer has a thickness of about 7 μm to about 60 μm.

20. The decorative sheet of claim 19, wherein the decoration layer includes about 5 wt % to about 35 wt % of the glass pigment.

21. A formed product comprising a formed product body and the decorative sheet of claim 1 that has been bonded to a surface of the formed product body.

22. The formed product of claim 21, wherein a portion of the decorative sheet that has been bonded to the surface of the formed product body is about 30% to about 40% as thick as the thickest portion thereof.

23. A transportation apparatus comprising the formed product of claim 21.

* * * * *